(12) United States Patent
Nonaka et al.

(10) Patent No.: US 11,420,236 B2
(45) Date of Patent: Aug. 23, 2022

(54) ULTRASONIC CLEANER AND AUTOMATIC ANALYZER USING THE SAME

(71) Applicant: Hitachi High-Tech Corporation, Tokyo (JP)

(72) Inventors: Kohei Nonaka, Tokyo (JP); Hiroyuki Takayama, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 17/270,486

(22) PCT Filed: Aug. 7, 2019

(86) PCT No.: PCT/JP2019/031124
§ 371 (c)(1),
(2) Date: Feb. 23, 2021

(87) PCT Pub. No.: WO2020/044998
PCT Pub. Date: Mar. 5, 2020

(65) Prior Publication Data
US 2021/0323035 A1 Oct. 21, 2021

(30) Foreign Application Priority Data

Aug. 28, 2018 (JP) .............................. JP2018-158983

(51) Int. Cl.
*B08B 3/12* (2006.01)
*G01N 35/10* (2006.01)
(52) U.S. Cl.
CPC ........... *B08B 3/12* (2013.01); *G01N 35/1004* (2013.01)

(58) Field of Classification Search
CPC .. B08B 3/12; B08B 3/14; B08B 17/02; B08B 7/028; G01N 35/1004; G01N 2035/00277;
(Continued)

(56) References Cited

U.S. PATENT DOCUMENTS

| 2006/0179946 A1 | 8/2006 | Wilson |
| 2019/0366391 A1 | 12/2019 | Horie et al. |
| 2020/0009619 A1 | 1/2020 | Nonaka et al. |

FOREIGN PATENT DOCUMENTS

| JP | 61-4792 U | 1/1986 |
| JP | 04-169850 A | 6/1992 |

(Continued)

OTHER PUBLICATIONS

International Search Report of PCT/JP2019/031124 dated Oct. 8, 2019.

(Continued)

*Primary Examiner* — Erin F Bergner
(74) *Attorney, Agent, or Firm* — Mattingly & Malur, PC

(57) ABSTRACT

Stable operation of an ultrasonic vibrator of an ultrasonic cleaner and scattering prevention of a washing liquid are provided. The ultrasonic cleaner includes a washing tank 206 in which a washing liquid is reserved; an ultrasonic vibrator 205; a vibration head 209 provided with a neck 304 extended from the ultrasonic vibrator to the washing tank and a tip end portion 210 having a cylindrical hole 211 whose longitudinal direction is oriented to a perpendicular direction; and a first cover 601 having an opening corresponding to the neck and the cylindrical hole, in which the first cover is arranged to a height in contact with a liquid surface of the washing liquid such that it covers the washing tank.

13 Claims, 15 Drawing Sheets

(58) Field of Classification Search
CPC ............... G01N 35/1002; G01N 35/10; B01L 2200/0689; B01L 2200/141; B01L 2300/04; B01L 2300/0841; B01L 2300/161; B01L 2400/0439; B01L 13/02; B01L 3/508; B01L 13/00; B01L 2300/06; B01L 2300/0858; B06B 3/00; B06B 1/0238; B06B 2201/71
See application file for complete search history.

(56) References Cited

FOREIGN PATENT DOCUMENTS

| JP | 2014-76440 A | 5/2014 |
|----|--------------|--------|
| JP | 2018-100871 A | 6/2018 |
| WO | 2018/116759 A | 6/2018 |

OTHER PUBLICATIONS

International Preliminary Report on Patentability (Chapter II of the Patent Cooperation Treaty) dated Jul. 16, 2020.
Extended European Search Report received in corresponding European Application No. 19854322.5 dated Mar. 28, 2022.

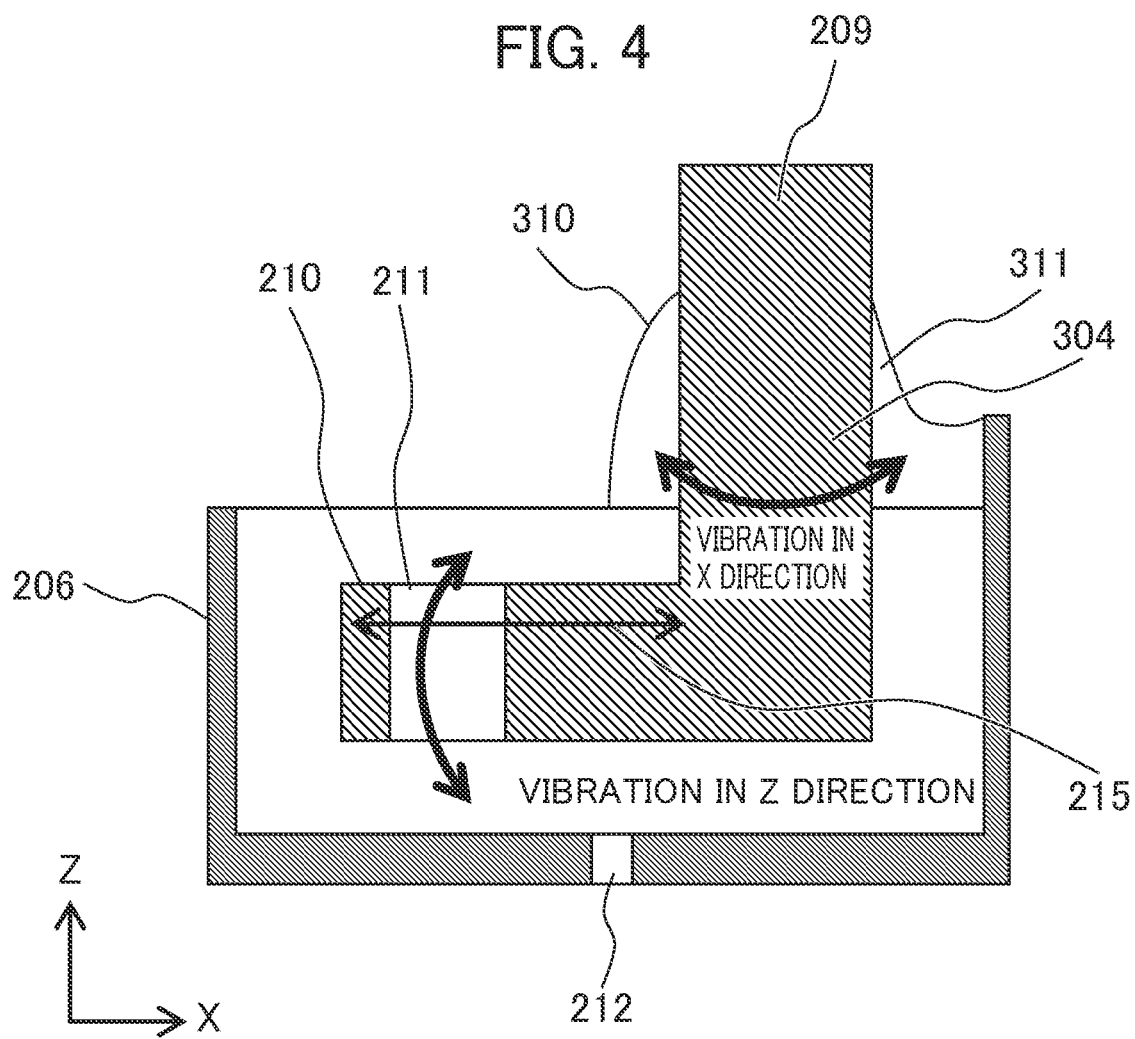

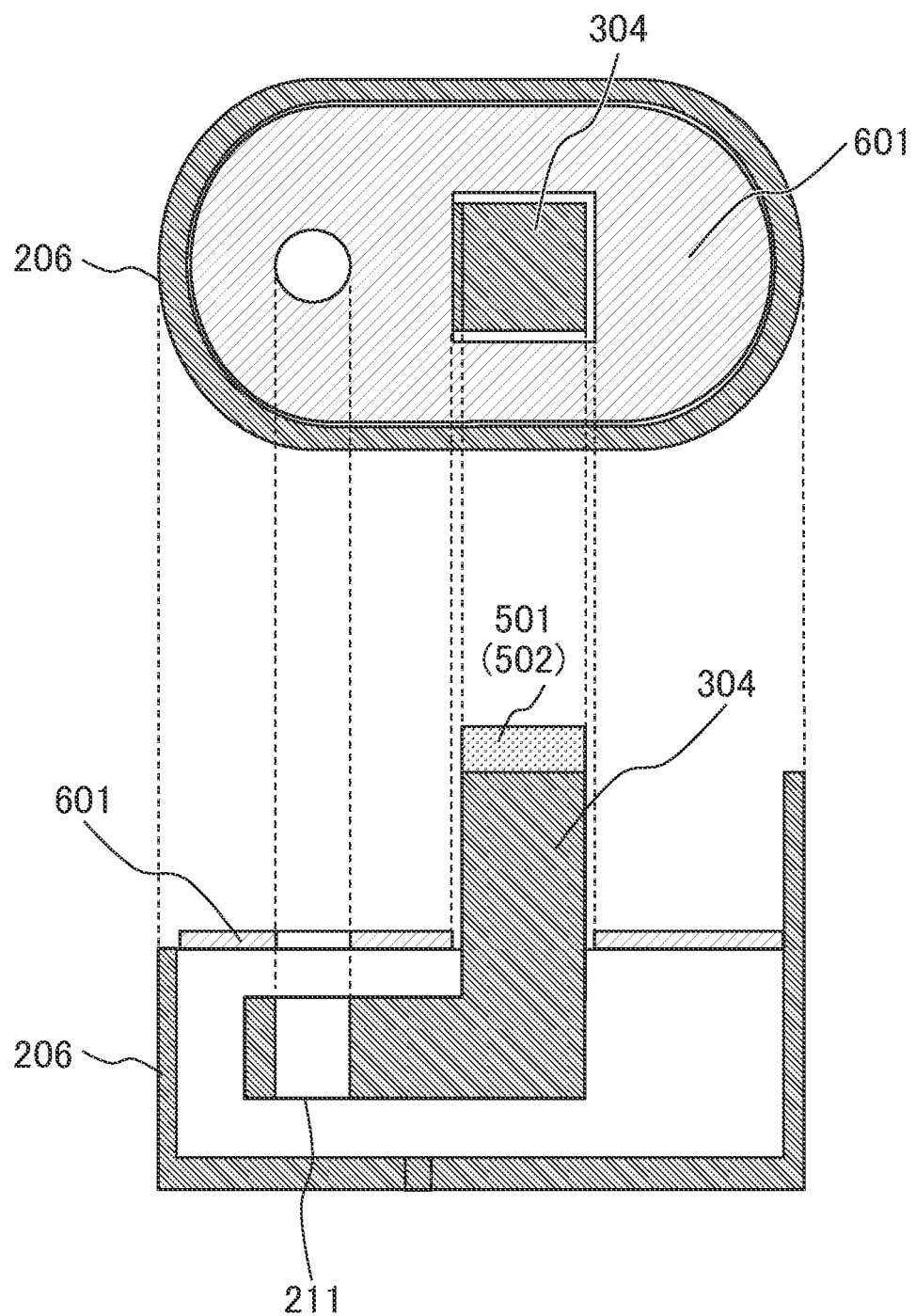

ULTRASONIC CLEANER AND AUTOMATIC ANALYZER USING THE SAME

TECHNICAL FIELD

The present invention relates to: an ultrasonic cleaner to wash a sample probe for dispensing a sample such as serum, urine, or the like; and an automatic analyzer that has the ultrasonic cleaner and analyzes a component by mixing the sample and a reagent.

BACKGROUND ART

In an automatic analyzer, in order to dispense samples by repeatedly using an identical sample probe, a sample probe tip is washed before another sample is aspirated. If a sample probe tip is washed insufficiently, a component in a previous sample is carried over to a next sample and measurement accuracy deteriorates. Since an automatic analyzer of high-throughput performance however performs dispensing processing at a high speed, not enough time can be used for washing a sample probe. Patent Literature 1 discloses that a sample deposit on a nozzle is removed by cavitation generated in a liquid by using an ultrasonic cleaner having a Langevin vibrator at the bottom of a washing tank.

CITATION LIST

Patent Literature

Patent Literature 1: Japanese Unexamined Patent Application Publication No. Hei4-169850

SUMMARY OF INVENTION

Technical Problem

A cleaner using ultrasonic waves is often used for hardly-removable dirt by setting the drive frequency of an ultrasonic vibrator to low frequencies (20 to 100 kHz). Washing of low frequencies makes use of cavitation (a phenomenon in which bubbles are generated and disappear by a pressure difference generated in a liquid) generated in a liquid. Cavitation however does not occur uniformly in a liquid and cavitation intensity varies in response to the intensity of ultrasonic waves. Intervals at which the regions of high ultrasonic intensity are generated vary in response to a frequency to be driven and a region of strong cavitation is formed for each distance obtained by dividing a speed of sound in a liquid (about 1,500 m/s in water) by a drive frequency of an ultrasonic vibrator. For example, when an ultrasonic vibrator is driven at 50 kHz, standing waves of a wavelength of 30 mm ($\lambda$) are generated and regions of high cavitation intensity are generated at the intervals of 15 mm ($\lambda/2$) that is a half wavelength of the standing waves. Further, a region of high cavitation intensity is also formed in the vicinity of a vibration surface where ultrasonic waves are generated.

In an ultrasonic cleaner having a Langevin vibrator at the lower part of a washing tank like Patent Literature 1 therefore, when the Langevin vibrator is driven at 20 to 100 kHz in order to obtain the effect of cavitation, the regions of high cavitation intensity are generated at the intervals of 7.5 mm (100 kHz drive) to 37.5 mm (20 kHz drive). A cavitation intensity is higher as it is closer to a vibrator that is a drive source. Further, since the ranges of regions where the cavitation is strong are narrow, the range of washing a sample probe is limited and uneven washing is likely to be generated. In addition, since an ultrasonic cleaner of a structure of having a vibrator at the lower part of a washing tank generates ultrasonic waves in a liquid in the interior by oscillating the bottom part of the stainless steel tank with the vibrator, the area of the bottom part increases. In the present invention therefore, a large displacement is caused by providing a vibration head at the tip of a Langevin vibrator and resonantly oscillating the vibration head near a liquid surface.

Meanwhile, washing is roughly divided into washing that makes use of chemical effect of a washing liquid and washing that makes use of physical effect of cavitation, straight flow, or the like and it is desirable to make use of both the effects in order to obtain a strong washing effect. Here, when a vibration source of a large amplitude is placed near a liquid surface, the liquid surface exhibits an unstable behavior and surging toward a vibration head is generated. The surging generated toward the vibration head is a heavy load on the operation of the vibrator and causes vibrator malfunction. The malfunction causes the liquid surface to be unstable and the washing liquid scatters around a probe, the vibrator, and the outside of a washing tank. If a scattered substance is mixed in a sample vessel or a reaction cell, the analysis of a sample is hindered.

Solution to Problem

An ultrasonic cleaner according to an embodiment of the present invention has a washing tank to store a washing liquid, an ultrasonic vibrator, a vibration head that has a neck extending from the ultrasonic vibrator toward the washing tank and a tip end portion having a cylindrical hole the longitudinal direction of which is a vertical direction, and a first cover having openings corresponding to the neck and the cylindrical hole, in which the first cover is installed at a height in contact with the surface of the washing liquid in the manner of covering the washing tank.

Advantageous Effects of Invention

The present invention contributes to the stable operation of ultrasonic washing and the reduction of maintenance frequency of an ultrasonic washing tank.

Other challenges and novel features will be obvious from the descriptions and attached drawings in the present description.

BRIEF DESCRIPTION OF THE DRAWINGS

FIG. 4 is a view illustrating the parts or the vibration head and the washing tank of the ultrasonic cleaner.

FIG. 8 illustrates one example in which the liquid surface cover is provided over the ultrasonic cleaner.

DESCRIPTION OF EMBODIMENTS

Embodiments according to the present invention are hereunder explained in detail in reference to drawings.

Figure 1:
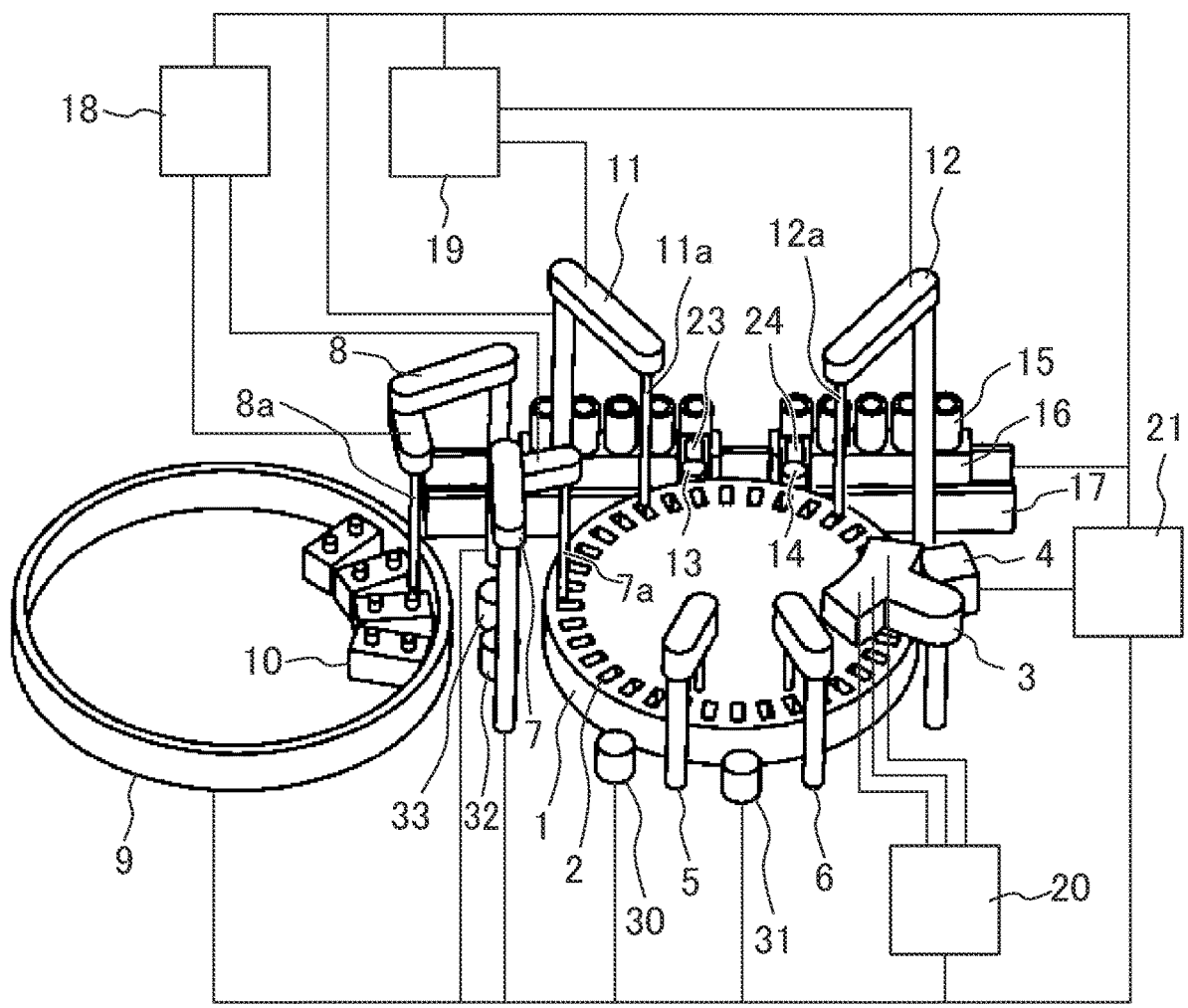
FIG. 1 is a schematic view of the automatic analyzer.

FIG. 1 is a schematic view of an automatic analyzer 100. A biological sample (hereinafter referred to simply as a sample) such as blood or urine to be analyzed is stored in a sample vessel 15. One or more sample vessels 15 are mounted on a sample rack 16 and transported by a sample transport mechanism 17. A reagent used for the analysis of a sample is stored in a reagent bottle 10 and a plurality of reagent bottles 10 are placed side by side in the circumferential direction on a reagent disk 9. A sample and a reagent are mixed and reacted in a reaction vessel 2. A plurality of reaction vessels 2 are placed side by side in the circumferential direction on a reaction disk 1. A sample is dispensed from a sample vessel 15 transported to a sample dispensing position by the sample transport mechanism 17 to the reaction vessel 2 by a first or second sample dispensing mechanism 11 or 12. On the other hand, a reagent is dispensed from a reagent bottle 10 to a reaction vessel 2 by a reagent dispensing mechanism 7 or 8. A mixed liquid (reaction liquid) of a sample and a reagent dispensed into a reaction vessel 2 is stirred by a stirring mechanism 5 or 6 and an absorbance of the reaction liquid is measured by measuring transmitted light obtained from a light source not shown in the figure through the reaction liquid in a reaction vessel 2 by a spectrophotometer 4. As analytical processing in the automatic analyzer 100, a concentration of a predetermined component and the like in analysis items according to a reagent are calculated from an absorbance of the mixed liquid (reaction liquid) measured by the spectrophotometer 4. A measured reaction vessel 2 is washed by a washing mechanism 3.

The first (second) sample dispensing mechanism 11 (12) has a sample probe 11a (12a) the tip of which is placed downward and a pump for sample 19 is connected to the sample probe 11a (12a). The first (second) sample dispensing mechanism 11 (12) is configured so as to be rotatable horizontally and movable vertically and a sample is dispensed from a sample vessel 15 to a reaction vessel 2 by inserting the sample probe 11a (12a) into the sample vessel 15 and aspirating the sample and inserting the sample probe 11a (12a) into the reaction vessel 2 and discharging the sample. An ultrasonic cleaner 23 (24) to wash the sample probe 11a (12a) by a washing liquid is placed in a movable range of the first (second) sample dispensing mechanism 11 (12). When a liquid other than water is used as the washing liquid, a washing tank 13 (14) to wash the sample probe 11a (12a) is placed in order to remove the washing liquid used for washing by water.

The reagent dispensing mechanism 7 or 8 has a reagent probe 7a or 8a the tip of which is placed downward and a pump for reagent 18 is connected to the reagent probe 7a or 8a. The reagent dispensing mechanism 7 or 8 is configured so as to be rotatable horizontally and movable vertically and a reagent is dispensed from a reagent bottle 10 to a reaction vessel 2 by inserting the reagent probe 7a or 8a into the reagent bottle 10 and aspirating the reagent and inserting the reagent probe 7a or 8a into the reaction vessel 2 and discharging the reagent. A washing tank 32 or 33 to wash the reagent probe 7a or 8a by a washing liquid is placed in a movable range of the reagent dispensing mechanism 7 or 8.

The stirring mechanism 5 or 6 is configured so as to be rotatable horizontally and movable vertically and stirs a mixed liquid (reaction liquid) of a sample and a reagent by being inserted into a reaction vessel 2. A washing tank 30 or 31 to wash the stirring mechanism 5 or 6 by a washing liquid is placed in a movable range of the stirring mechanism 5 or 6. Further, a washing pump 20 is connected to the washing mechanism 3.

Overall operation of the automatic analyzer 100 is controlled by a control unit 21. Here, connections between respective mechanisms constituting the automatic analyzer 100 and the control unit 21 are shown in FIG. 1 in a partially abbreviated manner in order to simplify the illustration.

Figure 2A:
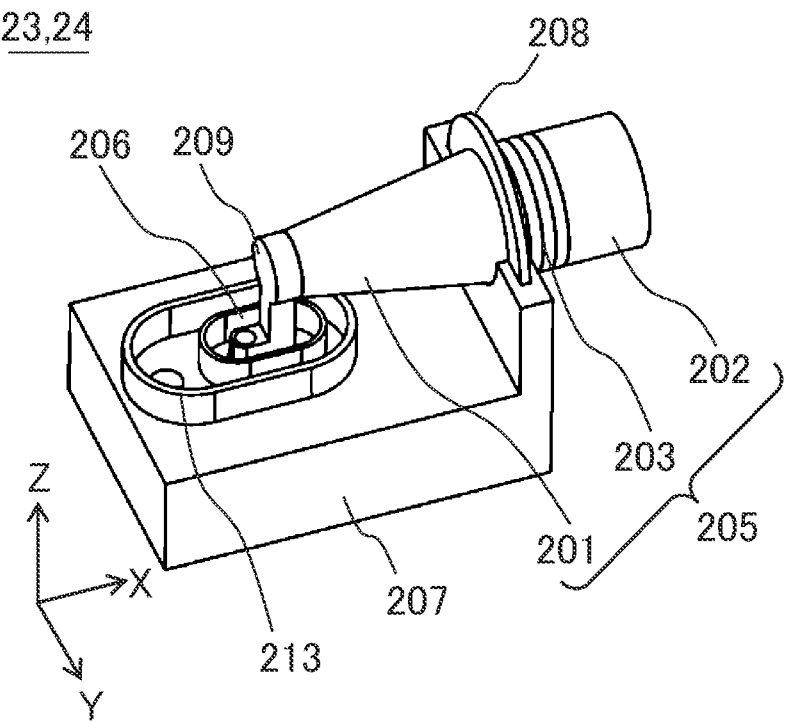
FIG. 2A is a perspective view of the ultrasonic cleaner.
Figure 2B:
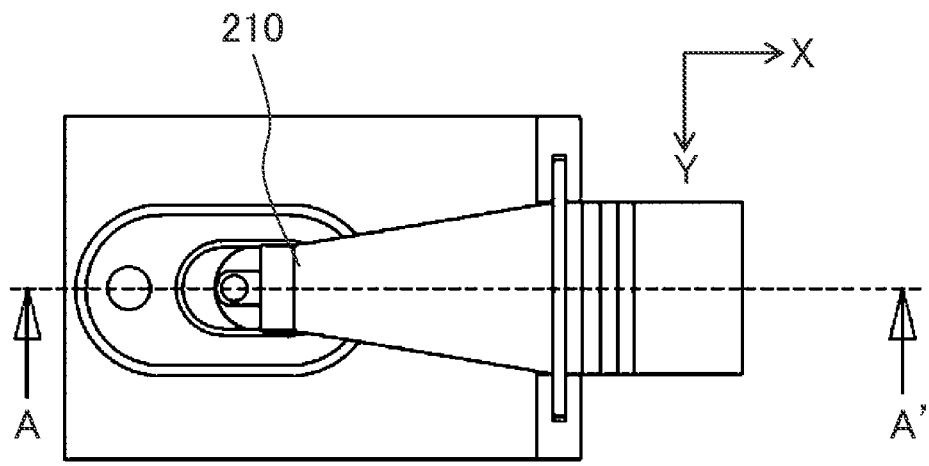
FIG. 2B is an upper view of the ultrasonic cleaner.
Figure 2C:
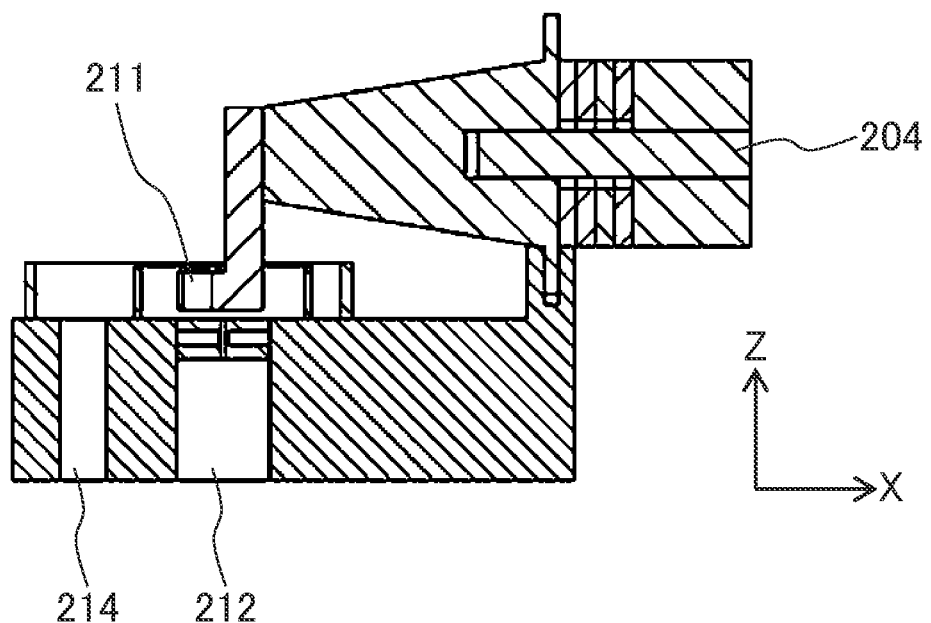
FIG. 2C is a cross-sectional view of the ultrasonic cleaner taken along line A-A'.
Figure 2D:
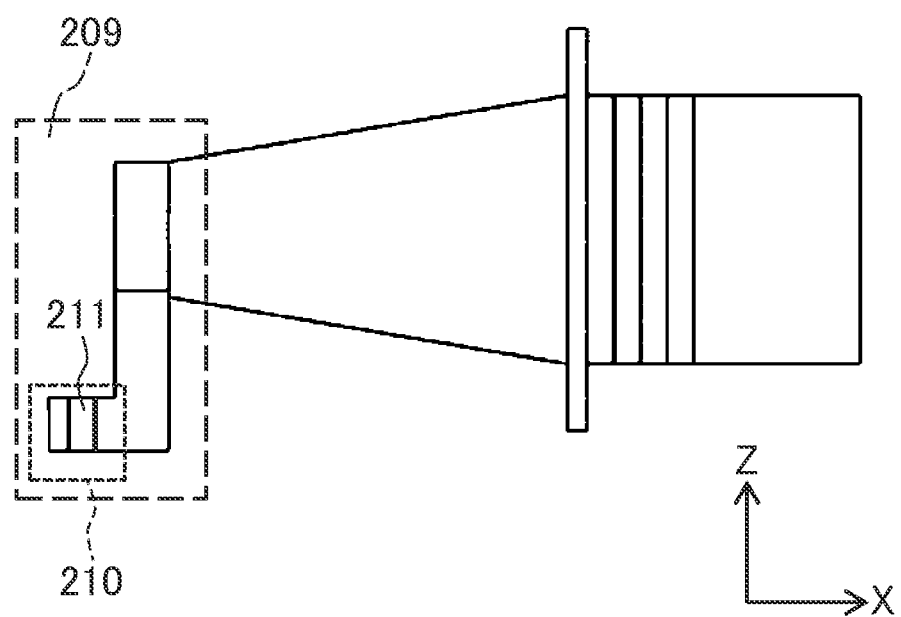
FIG. 2D shows side views of the ultrasonic vibrator and the vibration head.

A configuration example of an ultrasonic cleaner 23 or 24 is explained in reference to FIG. 2A through FIG. 2D. FIG. 2A is a perspective view of the ultrasonic cleaner 23 or 24, FIG. 2B is a top view, FIG. 2C is a cross-sectional view taken along line A-A' (FIG. 2B), and FIG. 2D is a side view of an ultrasonic vibrator and a vibration head.

The ultrasonic cleaner 23 or 24 has: an ultrasonic vibrator (BLT: Bolt-clamped Langevin Type Transducer) 205 configured by interposing one or more piezoelectric devices 203 between a front mass 201 and a rear mass 202 and fastening the front mass 201 and the rear mass 202 with a bolt 204; a vibration head 209; and a base section 207 provided with a washing tank 206 to store a washing liquid. Here, the axial direction of the bolt 204 in the ultrasonic vibrator 205 is defined as an X direction, a direction perpendicular to the X direction on an upper plane (horizontal plane) of the base section 207 is defined as a Y direction, and a direction perpendicular to the horizontal plane, namely a vertical direction, is defined as a Z direction.

The ultrasonic vibrator 205 has a flange section 208 and is fixed to the base section 207. Although the lower part of the flange section 208 is fixed to the base section 207 in the figures, it is also possible to uniformly fix the whole circumference of the flange section 208 by providing a member to fix the flange also at the upper part of the flange section 208 and connecting the member to the base section 207. Further, it is also possible to fix the flange section 208 partially or insert a cushioning material such as rubber at a position where the flange section 208 and the base section 207 are in contact with each other in order to prevent wear and noise of the flange section 208 and the base section 207.

Since there is a microscopic vibration although only slightly even in the flange section 208 however, if the flange section 208 sticks firmly to the base section 207, the vibration is transmitted from the flange section 208 to the base section 207 and the energy transmitted to the vibration head 209 is reduced to that extent. When the flange section 208 is fixed therefore, it is desirable to have the flange section 208 as a free end in the range where the ultrasonic vibrator 205 is self-supporting. Specifically, it is desirable to: inhibit the microscopic vibration of the flange section 208 from being transmitted to the base section 207; and provide a space between the flange section 208 and the base section 207 in order to vibrate the ultrasonic vibrator 205 with high efficiency.

The vibration head 209 extending toward the washing tank 206 is provided at the tip of the ultrasonic vibrator 205 on the front mass side. A tip end portion 210 of the vibration head 209 has a cylindrical shape and is adjusted so as to be located at a position where the tip end portion 210: is immersed in a washing liquid stored in the washing tank 206; and does not come into contact with the washing tank 206. A cylindrical hole 211 larger than the tip outer diameter of a sample probe is provided at the tip end portion of vibration head 210 of the cylindrical shape. Here, the front mass 201 and the vibration head 209 may be manufactured separately and fixed with a bolt or the like or manufactured integrally. Further, the washing tank 206 is provided with a pipe 212 to supply a washing liquid and can replace a washing liquid in the washing tank 206 by supplying a predetermined amount of washing liquid and overflowing the washing liquid. In other words, a washing liquid supplied from the washing liquid supply line 212 overflows from the upper edge of the sidewall of the washing tank 206, flows in a liquid receptacle 213 provided around the outer circumference of the washing tank 206, and is discharged from a drain pipe 214 and resultantly the height (liquid level) of the washing liquid in the washing tank 206 is kept constant every time when the washing liquid is supplied.

Electrodes (for example, copper plates) are interposed between the metal blocks (201 and 202) and the piezoelectric device 203 and between multiple segments of the piezoelectric device 203 although they are not shown in the figures and the ultrasonic vibrator 205 is driven in the axial direction of the bolt 204 by applying a sine wave voltage of a given frequency to the electrodes. In particular, it is known that the amplitude generated by the piezoelectric device 203 is increased by forming the front mass 201 into a horn shape (shape formed by differentiating the diameters between the piezoelectric device 203 side and the vibration head side) and a large amplitude can be obtained with a low power by designing the length and shape of the horn in conformity with a frequency desired for drive. Although a conical horn shape is shown in the figures, there is no problem with another shape (exponential horn shape or the like).

Moreover, it is possible to generate a large displacement at the tip end portion of vibration head 210 by providing an elongated vibration head 209 at the tip of the horn-shaped front mass 201 and resonating the vibration head 209 in synchronization with the vibration of the ultrasonic vibrator 205. That makes it possible to efficiently convert an electrical energy applied to the ultrasonic vibrator 205 into a vibration (kinetic energy) of the tip end portion of vibration head 210.

When a sample probe 11a or 12a is washed by the ultrasonic cleaner 23 or 24, dirt attaching to the outer circumference of the sample probe is removed by cavitation by: driving the piezoelectric device 203 at a predetermined low frequency; inserting the sample probe into the cylindrical hole 211 at the tip end portion of vibration head 210 so that the washing range (range of about 5 mm from the tip of the sample probe) of the sample probe may be immersed; and immersing the sample probe in a washing liquid for a certain period of time. After the washing, when a next sample probe is washed, the sample probe can be washed with a new washing liquid and carryover can be suppressed by extracting the washed sample probe from the ultrasonic cleaner and exchanging the washing liquid in the washing tank 206 by overflow. The control is implemented in accordance with predetermined device sequence by the control unit 21.

The ultrasonic cleaner 23 or 24: drives the piezoelectric device 203 at a frequency of 20 to 100 kHz suitable for generating cavitation in a washing liquid; resonates the vibration head 209 in the washing tank 206; and generates ultrasonic vibration by vibration (frequency is the same as the drive frequency) of a large displacement. As a result, cavitation is generated around the vibration head 209, particularly around a belly of vibration (part of a largest amplitude). Since the tip end portion of vibration head 210 that is an open end becomes a belly of vibration, a sample probe tip is intensively washed by the cavitation generated in the cylindrical hole 211. Here, even if water is used as a washing liquid, a high washing effect can still be obtained and, for example, even warm water is effective to dirt such as protein and it is acceptable to use a washing liquid according to a desired washing effect.

Figure 3A:
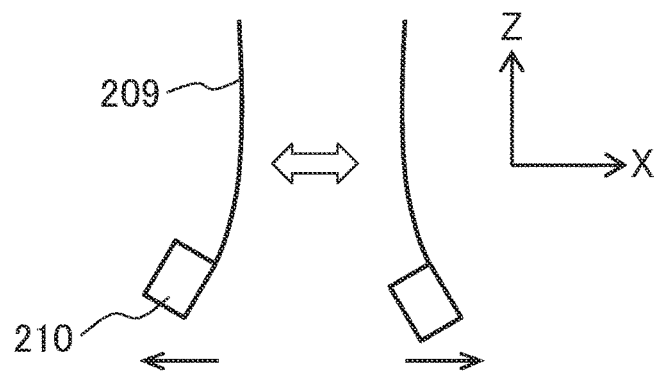
FIG. 3A is a view illustrating the deformation of the vibration head according to the primary vibration mode.
Figure 3B:
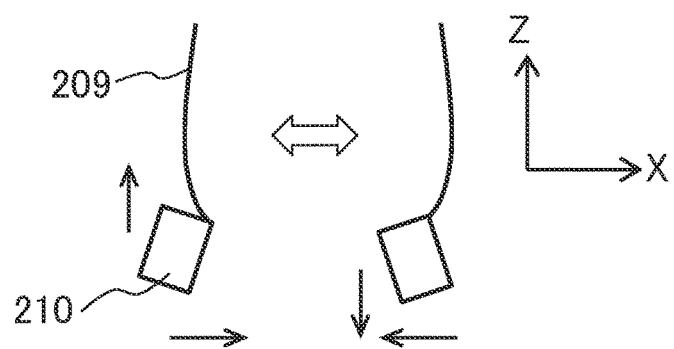
FIG. 3B is a view illustrating the deformation of the vibration head according to the secondary vibration mode.
Figure 3C:
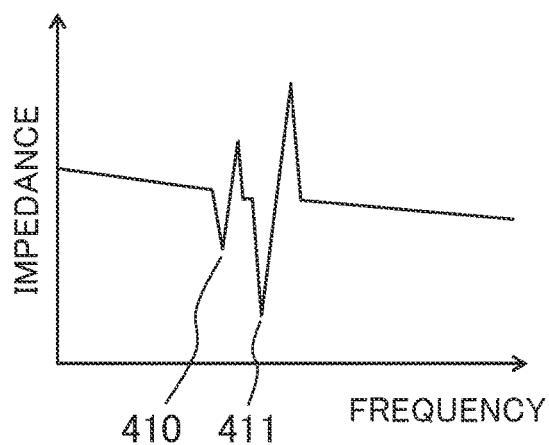
FIG. 3C illustrates an impedance waveform of the ultrasonic vibrator to which the vibration head is attached.

The vibration of the vibration head 209 is explained in reference to FIGS. 3A to 3C. The vibration head 209 has a plurality of vibration modes depending on how to deform due to resonance vibration. Deformation of a primary vibration mode of the vibration head 209 is shown in FIG. 3A, deformation of a secondary vibration mode of the vibration head 209 is shown in FIG. 3B, and an impedance wave form of an ultrasonic vibrator to which the vibration head 209 is attached is shown in FIG. 3C.

The vibration head 209 has a plurality of resonance frequencies and different deformations occur during resonance respectively. FIG. 3A is the primary vibration mode and is a vibration mode in which the tip end portion of vibration head 210 vibrates in the X direction. FIG. 3B is the secondary vibration mode and is a vibration mode in which the tip end portion of vibration head 210 vibrates in the X direction and in the vertical direction (Z direction) while a node of vibration (part of a smallest vibration) is formed in the middle of the tip end portion of vibration head 210. Here, in the figures, the deformations are exaggerated in order to make it easier to see the difference between the vibration modes.

FIG. 3C is a graph showing a frequency in the horizontal axis and an impedance in the vertical axis. A resonant point 410 of the vibration head 209 and a resonant point 411 (mode in which the ultrasonic vibrator 205 expands and contracts in the axial direction of the bolt 204) of the ultrasonic vibrator 205 are shown. The resonant point 410 may be a resonant point in the primary vibration mode or a resonant point in the secondary vibration mode but has to be a vibration mode used for washing and the resonance frequency has to exist in the range of 20 to 100 kHz at which cavitation tends to be generated. Moreover, it is desirable to design the vibration head 209 and the ultrasonic vibrator 205 so that the resonant point 410 and the resonant point 411 may come close to each other and the absolute value of the difference may be 10 kHz or lower. This is because electrical energy can be converted into the vibration of the tip end portion of vibration head 210 efficiently by interaction by bringing the resonant points close to each other.

FIG. 4 is a view illustrating parts of the vibration head 209 and the washing tank 206 in an ultrasonic cleaner according to the present embodiment. The vibration head 209 is considered to vibrate at a resonant point in the secondary vibration mode and has both vibration in the X direction and vibration in the Z direction. As it has been described earlier, the tip end portion of vibration head 210 is located in a washing liquid in the washing tank 206 and washes a sample prove inserted in the cylindrical hole 211. The sample probe therefore is washed by cavitation generated near the inner wall of the cylindrical hole 211. When the vibration head 209 vibrates ultrasonically, surging of washing liquid 310 occurs around the vibration head 209 and partially becomes at a liquid level higher than the edge of the washing tank 206. When the cylindrical hole 211 is located at a position near a neck 304 (part of the vibration head 209 existing between the front mass 201 and the tip end portion of vibration head 210 and extending in the Z direction) of the vibration head 209 therefore, the range of a sample probe submerged in a washing liquid during washing expands and the sample probe gets wet to 7 mm with respect to a set range of 5 mm for example. When a liquid other than water is used as a washing liquid, water rinse has to be applied to a washed part of the sample probe in order to remove the washing liquid and it becomes necessary to expand the washing range at the water rinse process. Problems in expanding the washing range are that the throughput lowers and water is likely to remain in the sample probe and a sample is diluted. A head tip length 215 therefore is desirable to be a length at which the position of the cylindrical hole 211 is separated from the neck 304 of the vibration head 209 to the extent that the sample probe does not get in contact with surging of washing liquid 310.

There is the possibility that moisture of a washing liquid attaching to the neck 304 evaporates and the ingredients precipitate by a surging phenomenon of the washing liquid. The problems and solutions are explained in reference to FIG. 5 and FIG. 6.

Figure 5:
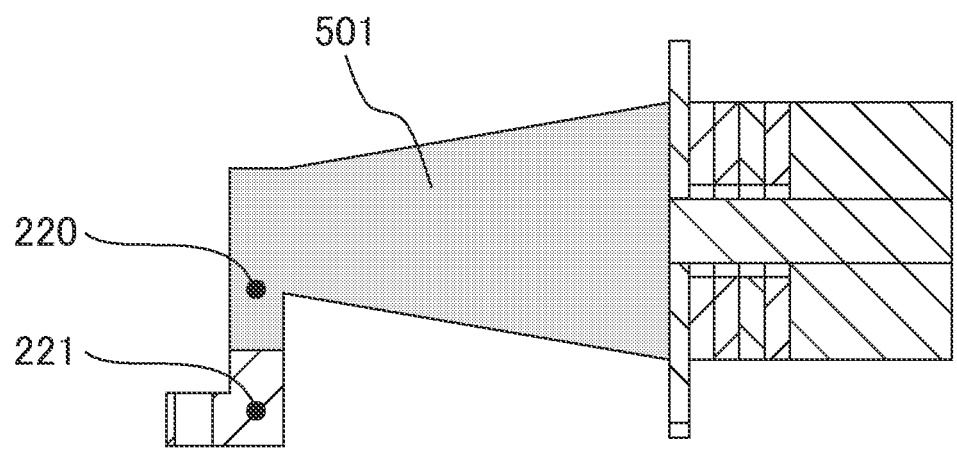
FIG. 5 illustrates one example of coating for the vibration head and the ultrasonic vibrator.

In the case of the primary vibration mode shown in FIG. 3A, as shown in FIG. 5, a belly of vibration (part of a largest amplitude) 221 appears at the tip of the vibration head 209 and a node of vibration (part of a smallest amplitude) 220 appears at a root (connection part of the vibration head 209 and the ultrasonic vibrator 205) of the neck 304. A washing liquid reaches the node of vibration 220 where the amplitude is small by a surging phenomenon of the washing liquid generated by the vibration of the tip end portion of vibration head 210. When the washing liquid tends to precipitate at the time of evaporation, the washing liquid that has reached the node of vibration 220, because an interface with an air layer exists, generates a precipitation phenomenon there. When the washing liquid precipitates, in the vicinity of the belly of vibration 221, the displacement is large and hence it is possible to exfoliate a precipitated substance from the neck 304 but, in the vicinity of the node of vibration 220 of a small amplitude, the precipitated washing liquid is hardly exfoliated and the precipitated substance may possibly become bloated with the lapse of time.

The precipitated washing liquid therefore is inhibited from sticking firmly by applying a hydrophobic or hydrophilic coating film 501 at least to the node 220. For example, a coating film such as a fluororesin film is formed near a part that will become a node 220. There is the effect that the washing liquid is inhibited from precipitating by making the washing liquid difficult to stay in the case of hydrophobic coating and the washing liquid is inhibited from precipitating by spreading the washing liquid thinly over the coated region in the case of hydrophilic coating. As shown in FIG. 5, the range of the coating film 501 is arranged so as to: have a coating interface between the node of vibration 220 and the belly of vibration 221; and coat the side of the node of vibration 220. This is because, if the belly of vibration 221 is included in the coating, the coating film 501 may possibly exfoliate because the amplitude of the vibration head 209 is large and is unsuitable for long-term use. The coating film on the side of the node of vibration 220 may be applied to the vibration head 209 or the entire front mass 201.

Figure 6:
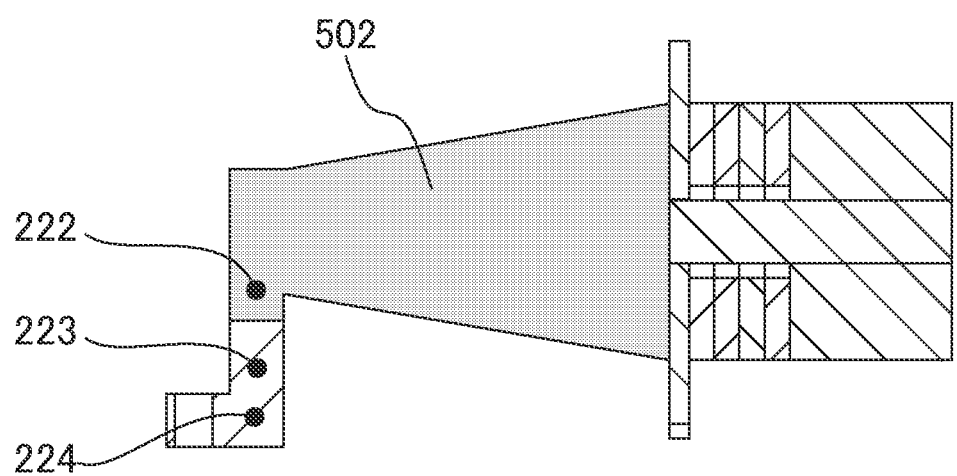
FIG. 6 illustrates one example of coating for the vibration head and the ultrasonic vibrator.

Likewise, in the case of the secondary vibration mode shown in FIG. 3B, as shown in FIG. 6, a belly of vibration (part of a largest amplitude) 223 appears in the middle section of the vibration head 209 and, as a node of vibration (part of a smallest amplitude), a first node of vibration 222 appears at a root (connection part of the vibration head 209 and the ultrasonic vibrator 205) of the neck 304 and a second node of vibration 224 appears at the tip of the vibration head 209. A washing liquid reaches the node of vibration 222 where the amplitude is small by a surging phenomenon of the washing liquid generated by the vibration of the tip end portion of vibration head 210. When the washing liquid tends to precipitate at the time of evaporation, the washing liquid that has reached the node of vibration 222, because an interface with an air layer exists, generates a precipitation phenomenon there. When the washing liquid precipitates, in the vicinity of the belly of vibration 223, the displacement is large and hence it is possible to exfoliate a precipitated substance from the neck 304 but, in the vicinity of the node of vibration 222 of a small amplitude, the precipitated washing liquid is hardly exfoliated and the precipitated substance may possibly become bloated with the lapse of time.

The precipitated washing liquid therefore is inhibited from sticking firmly by applying a hydrophobic or hydrophilic coating film 502 at least to the first node 222. For example, a coating film such as a fluororesin film is formed near a part that will become the first node 222. As shown in FIG. 6, the range of the coating film 502 is arranged so as to: have a coating interface between the first node of vibration 222 and the belly of vibration 223; and coat the side of the first node of vibration 222. This is because, if the belly of vibration 223 is included in the coating, the coating film 502 may possibly exfoliate because the amplitude of the vibration head 209 is large and is unsuitable for long-term use. The coating film on the side of the first node of vibration 222 may be applied to the vibration head 209 or the entire front mass 201.

Figure 7A:
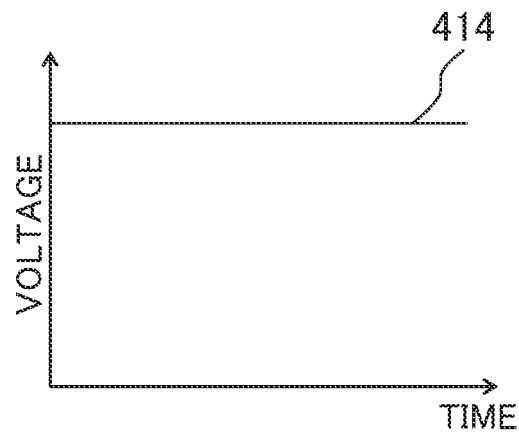
FIG. 7A illustrates one example of controlling voltage to be applied to the ultrasonic vibrator.
Figure 7B:
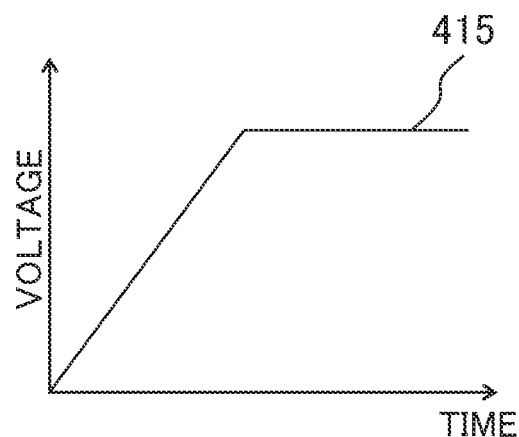
FIG. 7B illustrates one example of controlling voltage to be applied to the ultrasonic vibrator.
Figure 7C:
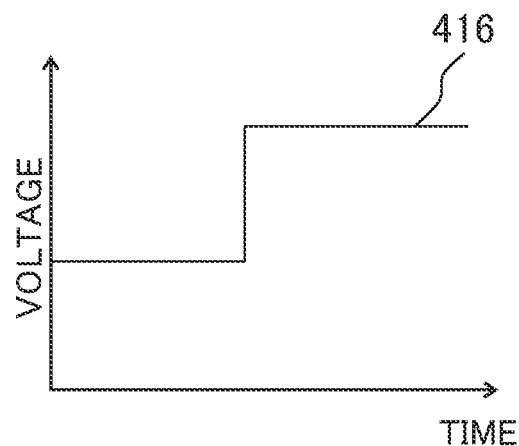
FIG. 7C illustrates one example of controlling voltage to be applied to the ultrasonic vibrator.

Further, during ultrasonic washing, it sometimes happens that not only the liquid surface surges (310 or 311) over the neck 304 of the vibration head 209 as shown in FIG. 4 but also the liquid surface (particularly a surging part) gets wild and resultantly the washing liquid causes to scatter around. At the beginning of operation in particular, when rapid voltage application 414 is performed to the piezoelectric device 203 as shown in FIG. 7A, the liquid surface changes rapidly and the wild washing liquid causes to scatter. The vibration of the piezoelectric device 203 therefore is started in the state of a smaller amplitude. For example, soft start control (voltage application 415) of gradually increasing an applied voltage as shown in FIG. 7B or step control (voltage application 416) of stepwise increasing an applied voltage as shown in FIG. 7C is implemented. As a result, it becomes possible to prevent the behaviors of the ultrasonic vibrator 205 and the liquid surface from changing rapidly and inhibit the washing liquid from scattering.

Figure 3D:
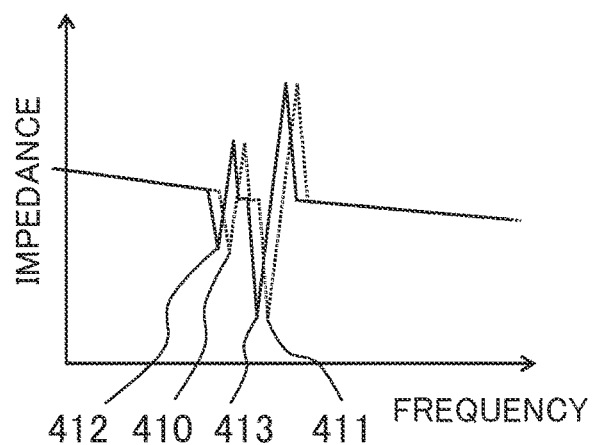
FIG. 3D illustrates an impedance waveform of the ultrasonic vibrator in the case where the washing liquid has surged up to the neck of the vibration head.

It is impossible however to completely inhibit a washing liquid from scattering only by such control. If the ultrasonic vibrator 205 starts vibrating in the state of suppressing the vibration amplitude of the piezoelectric device 203, at the beginning of voltage application, the washing liquid acts as a load on the tip end portion of vibration head 210 in the washing liquid and hence the neck 304 that is not immersed in the washing liquid starts vibrating in advance. At the beginning of voltage application therefore, surging larger than the surging 310 or 311 (refer to FIG. 4) formed during normal operation of the ultrasonic vibrator 205 is formed. The largely surging washing liquid is a load on the neck 304 and the ultrasonic vibrator 205 exhibits an impedance characteristic different from the impedance characteristic (refer to FIG. 3C) exhibited by the ultrasonic vibrator 205 alone. In the example of FIG. 3D for example, the resonant point 410 of the vibration head 209 shifts toward the resonant point 412 and the resonant point 411 of the ultrasonic vibrator 205 shifts toward the resonant point 413 by the influence of surging of the washing liquid on the neck.

The ultrasonic vibrator 205 that has changed the impedance characteristic and is in an inefficient operation mode in this way causes malfunction. The amplitude of the tip end portion of vibration head 210 lowers and resultantly the washing effect of a sample probe 11*a* or 12*a* also lowers. The malfunction continues as long as the washing liquid surging over the neck 304 is not destroyed by some sort of a disturbance factor. An example of the disturbance factor is the insertion of a sample probe 11*a* or 12*a* into the washing tank. By inserting a sample probe 11*a* or 12*a* into the cylindrical hole 211, the impedance of the whole washing tank changes and the operation mode shifts from the malfunction mode to the normal mode. When the operation mode shifts however, since the neck 304 exhibits an unsteady and unstable behavior, the rampage of the washing liquid becomes the largest and the risk of attaching the washing liquid to a sample probe 11*a* or 12*a* during insertion, the rear surface of the front mass 201, and the like increases.

Since a washing liquid cannot be inhibited from scattering only by vibration control of the ultrasonic vibrator 205 in this way, it is desirable to provide the washing tank with a mechanism of stabilizing a liquid surface and suppressing the surging of the washing liquid and a mechanism of inhibiting the washing liquid from scattering.

Figure 9:
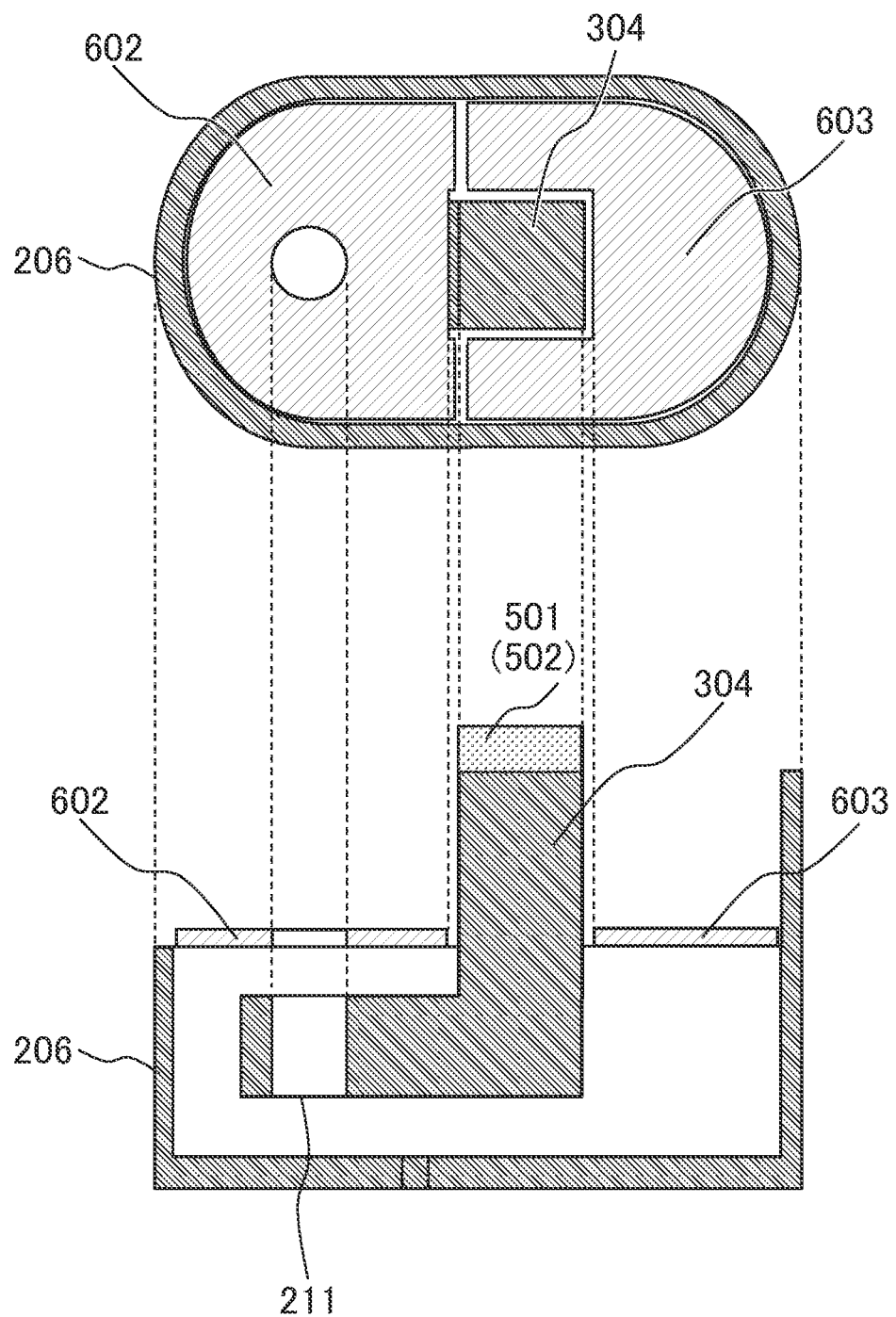
FIG. 9 illustrates one example in which the liquid surface cover is provided over the ultrasonic cleaner.

Firstly, as shown in FIG. 8, a liquid surface cover 601 is installed so as to cover a washing tank at a height of being in contact with the liquid surface of a washing liquid (a top view is shown at the upper part and a cross-sectional view is shown at the lower part in FIG. 8. The same applies to FIGS. 9 to 11A). The liquid surface cover 601 is provided with openings corresponding to a cylindrical hole 211 and a neck 304 and a vibration head and a sample probe can be inserted into a washing tank 206. By installing the liquid surface cover 601 at a height of being in contact with the liquid surface, it is possible to apply an interfacial tension between the washing liquid and the liquid surface cover and stabilize the liquid surface of the washing liquid. Since the washing liquid is a solution of a high pH in general, the material of the liquid surface cover 601 is a metal that can withstand the washing liquid so as not to be corroded by the washing liquid. Further, a metal tends to stabilize the reflection of ultrasonic waves generated from an ultrasonic vibrator 205 and contributes to space saving because the strength is high. With regard to a shape, an integrated structure as shown in FIG. 8 is ideal but a separated structure as shown in FIG. 9 can be substituted by installing liquid surface covers 602 and 603 so as to make a space between the liquid surface covers 602 and 603 as narrow as possible. The division makes it easier to install the liquid surface covers over the washing tank.

Figure 10:
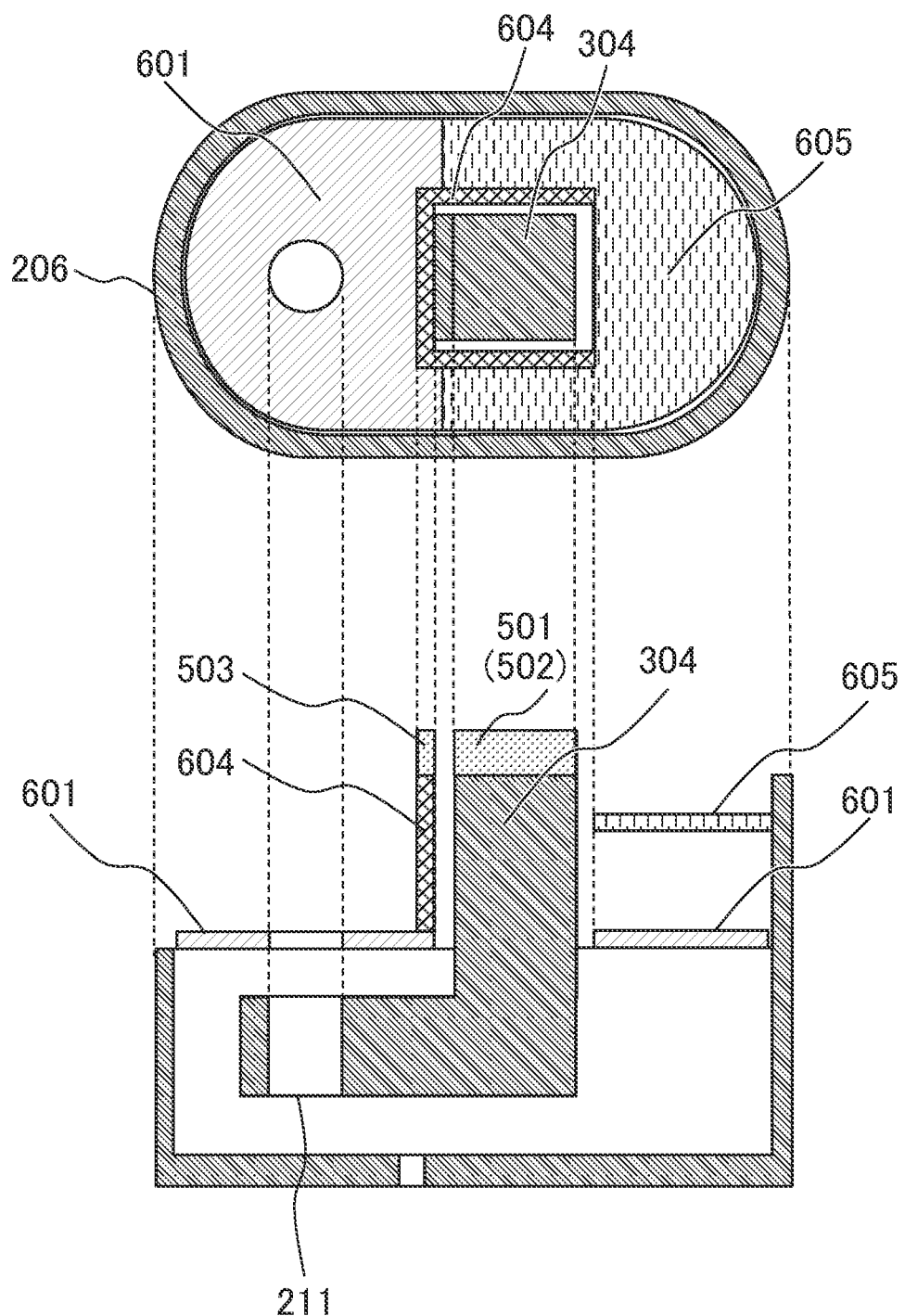
FIG. 10 illustrates one example in which the liquid surface cover, the scattering prevention cover, and the surging suppression cover are provided over the ultrasonic cleaner.

Moreover, with the aim of inhibiting a washing liquid from scattering to a sample probe 11*a* or 12*a* inserted into a cylindrical hole 211, a scattering prevention cover 604 is installed between the cylindrical hole 211 and a neck 304 as shown in FIG. 10. The material is the same as that of the liquid surface cover. Since the neck 304 vibrates, the space between the liquid surface cover 601 and the neck 304 cannot be eliminated. The washing liquid therefore: surges from the space between the scattering prevention cover 604 and the neck 304; and reaches a node of vibration 220 (primary vibration mode) or 222 (secondary vibration mode) which has a small amplitude (refer to FIG. 5 and FIG. 6). When the washing liquid tends to precipitate therefore, the washing liquid that has reached the height of the node of vibration 220 or 222, because an interface with an air layer exists, generates a precipitation phenomenon also to the scattering prevention cover 604 at the same height as a front mass 201 or a vibration head 209. Hydrophobic or hydrophilic coating therefore is applied to the scattering prevention cover 604 up to the same height as a coating film 501 (502) applied to the vibration head 209 or the front mass 201 and the precipitated washing liquid is prevented from sticking. This is the same as the reason why the coating interface to the vibration head 209 or the front mass 201 is positioned and a coating film 503 may possibly exfoliate under the influence of a large amplitude of the vibration head 209 when coating is applied up to the height of a belly of vibration 221 or 223 and that is unsuitable for long-term use.

Further, if the scattering prevention cover 604 is provide so as to surround the entire circumference of the vibration head 209, there is the risk that the washing liquid: surges vigorously through a narrow space between the scattering prevention cover 604 and the vibration head 209; and scatters around from over the scattering prevention cover 604. The scattering prevention cover 604 therefore is open on the rear side of the neck 304 (on the side of the neck 304 opposite to the cylindrical hole 211). There is therefore the risk that the washing liquid that has surged over the rear side of the neck 304 may be in contact with the connection part of the vibration head 209 and the ultrasonic vibrator 205. On the rear side of the neck 304 therefore, a surging suppressing cover 605 is installed between the root of the neck 304 (connection part of the vibration head 209 and the ultrasonic vibrator 205) and the liquid surface cover 601 so as to be parallel with the liquid surface cover 601. The material of the surging suppressing cover 605 is also the same as those of the other covers. As a result, it is possible to inhibit the surging generated over the liquid surface cover 601 from rising. Further, by placing the scattering prevention cover 604 on the front side of the neck 304 and the surging suppressing cover 605 on the rear side of the neck 304, those covers can be installed easily over the washing tank in the manner of not hindering the washing operation.

Figure 11A:
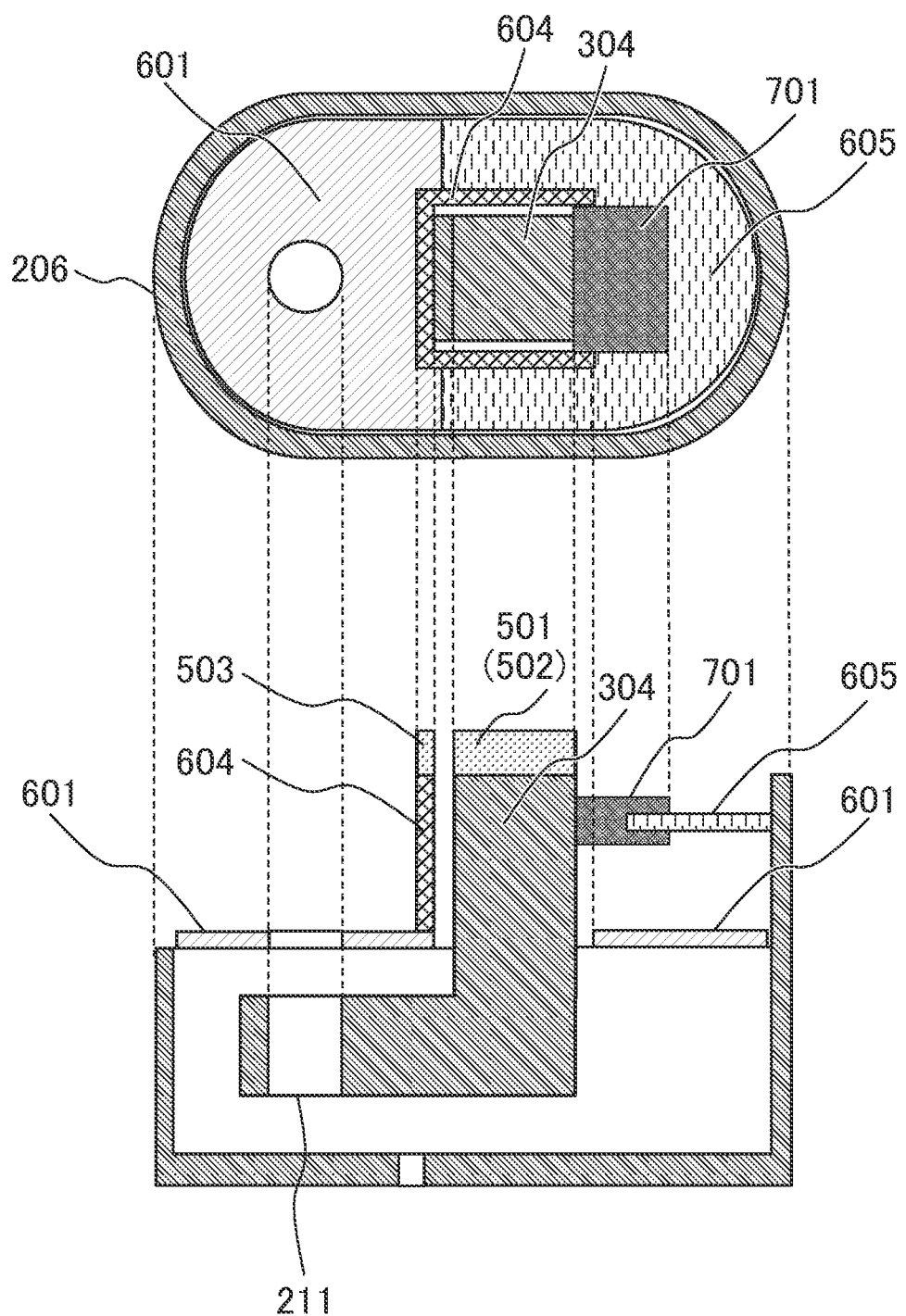
FIG. 11A illustrates one example in which the liquid surface cover, the scattering prevention cover, and the surge suppressing cover attached with the sealing material are provided over the ultrasonic cleaner.
Figure 11B:
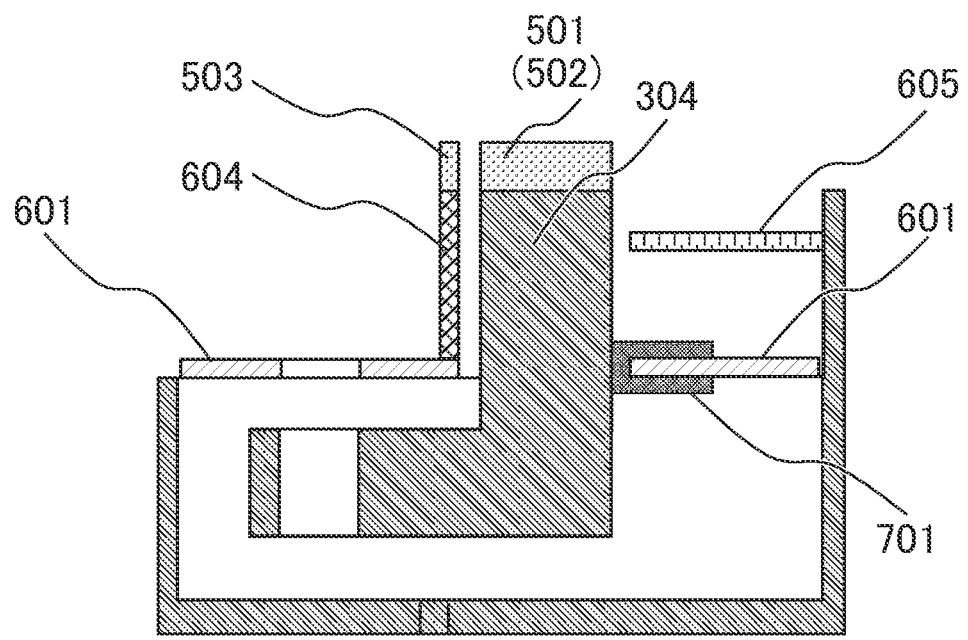
FIG. 11B illustrates one example in which the liquid surface cover is attached with the sealing material.
Figure 11C:
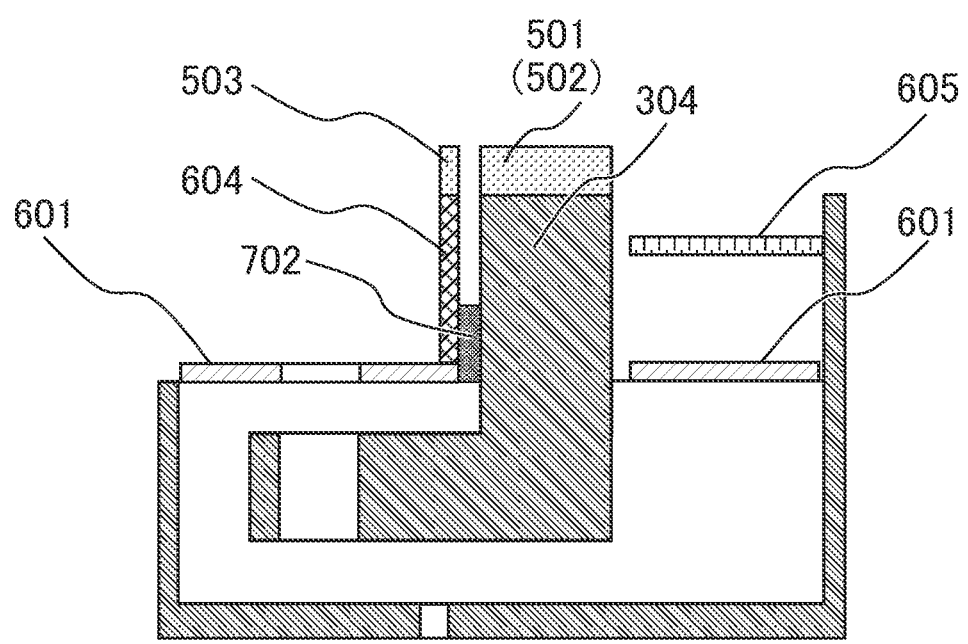
FIG. 11C illustrates one example in which the scattering prevention cover is attached with the sealing material.

In order to further suppress the surging toward the neck 304, a rubber that is a sealing material (buffer) 701 is provided between the surging suppressing cover 605 and the neck 304 as shown in FIG. 11A. The sealing material (buffer) 701 comprises a material withstanding a washing liquid, is installed between the washing liquid surface and the connection part of the vibration head 209 and the ultrasonic vibrator 205, and is in contact with the neck 304. The sealing material 701 therefore may be installed for example at the liquid surface cover 601 as shown in FIG. 11B. Furthermore, it is also possible to install a sealing material 702 between the scattering prevention cover 604 and the neck 304 on the front side of the neck 304 (on the cylindrical hole 211 side of the neck 304) as shown in FIG. 11C. By placing the sealing material 702 so as to be in contact with the neck 304, it is possible to suppress the surging between the scattering prevention cover 604 and the neck 304.

In the ultrasonic vibrator 205, in the case of the primary vibration mode (refer to FIG. 3A), as shown in FIG. 5, a belly of vibration (part of a largest amplitude) 221 appears at the tip of the vibration head 209 and a node of vibration (part of a smallest amplitude) 220 appears at the root (connection part of the vibration head 209 and the ultrasonic vibrator 205) of the neck 304. In the case of the secondary vibration mode (refer to FIG. 3B), as shown in FIG. 6, a belly of vibration (part of a largest amplitude) 223 appears in the middle section of the vibration head 209 and, as nodes of vibration (parts of a smallest amplitude), a first node of vibration 222 appears at the root (connection part of the vibration head 209 and the ultrasonic vibrator 205) of the neck 304 and a second node of vibration 224 appears at the tip of the vibration head 209. It is desirable to install the sealing material 701 at a position to avoid the belly of vibration 221 or 223 as much as possible so as not to put a load on the neck 304. It is however possible to install the sealing material 701 at the belly of vibration 221 or 223 by reducing the area of the sealing material that touches the neck 304 or reducing the hardness of the sealing material.

Figure 12A:
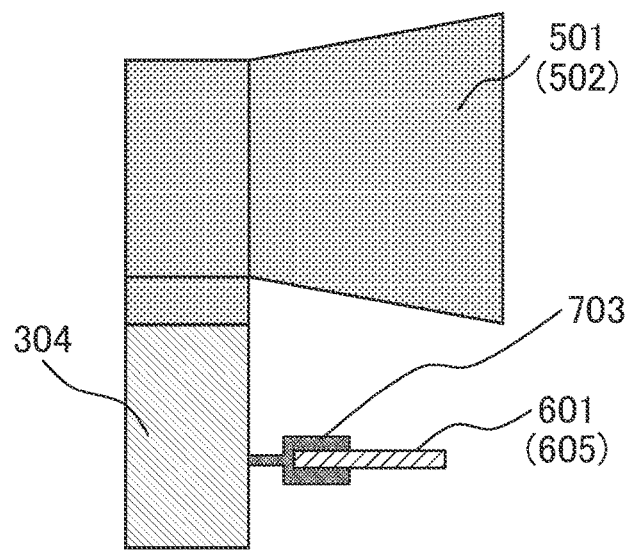
FIG. 12A illustrates a shape of the sealing material according to one example.
Figures 12B, 12C:
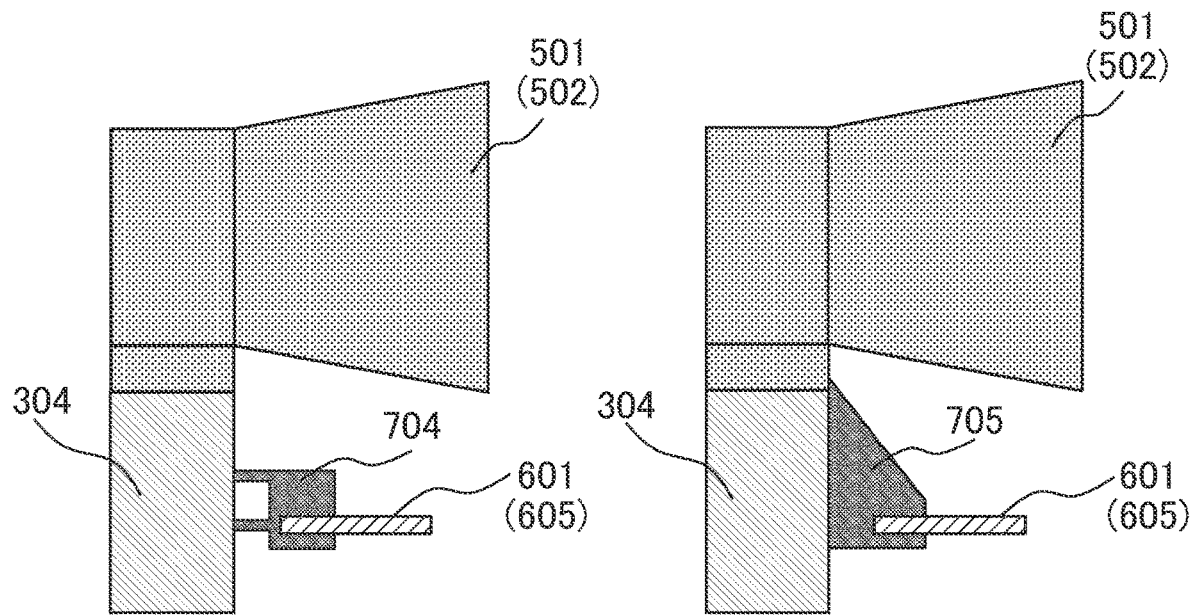
FIG. 12B illustrates a shape of the sealing material according to one example.
FIG. 12C illustrates a shape of the sealing material according to one example.
Figure 12D:
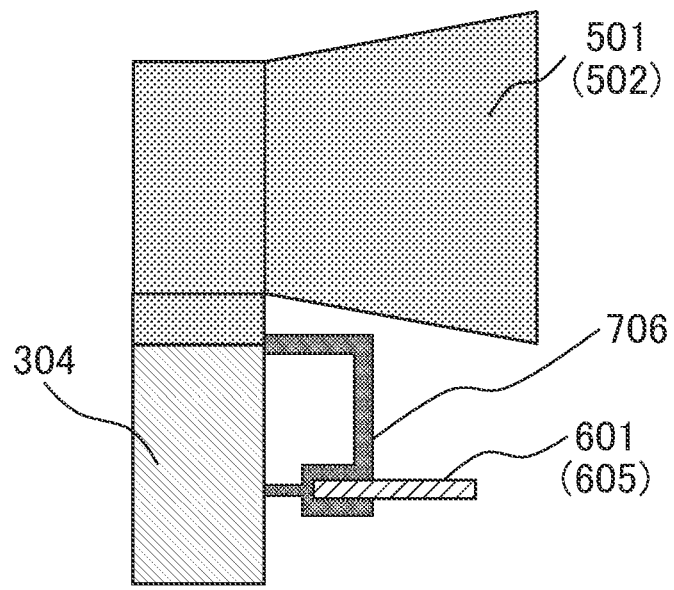
FIG. 12D illustrates a shape of the sealing material according to one example.
Figure 12E:
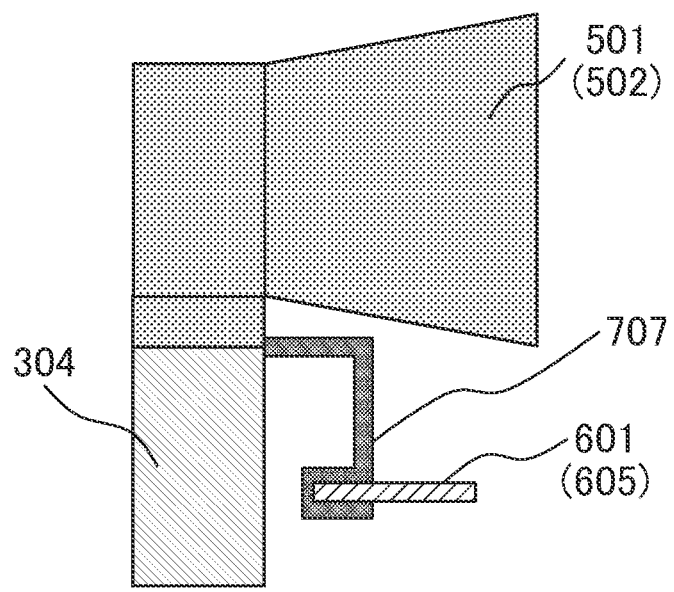
FIG. 12E illustrates a shape of the sealing material according to one example.

Examples of sealing material shapes are shown in FIGS. 12A to 12E. A sealing material 703 in FIG. 12A reduces the contact area with the neck 304 and reduces a load on the neck 304. A sealing material 704 in FIG. 12B has two contact sites with the neck 304 and can further suppress surging generated toward the neck 304. A sealing material 705 in FIG. 12C makes the contact area with the neck 304 as large as possible and hence can expect to completely suppress surging. The sealing material 705 however has the shape with the largest load on the neck 304 among the illustrated shapes and hence it is necessary to take measures such as keeping the hardness of the sealing material 705 low. The shape of a sealing material 706 in FIG. 12D is a shape example for installing the sealing material 706 while avoiding the belly of vibration 223 of the neck 304 in the case of the secondary vibration mode and it is possible to suppress not only surging but also the operation suppression of the ultrasonic vibrator 205 as much as possible. The shape of a sealing material 707 in FIG. 12E can suppress the contact of the washing liquid with the connection part of the vibration head 209 and the ultrasonic vibrator 205 when the amplitude of the tip end portion of vibration head 210 is small and surging is small.

Figure 13:
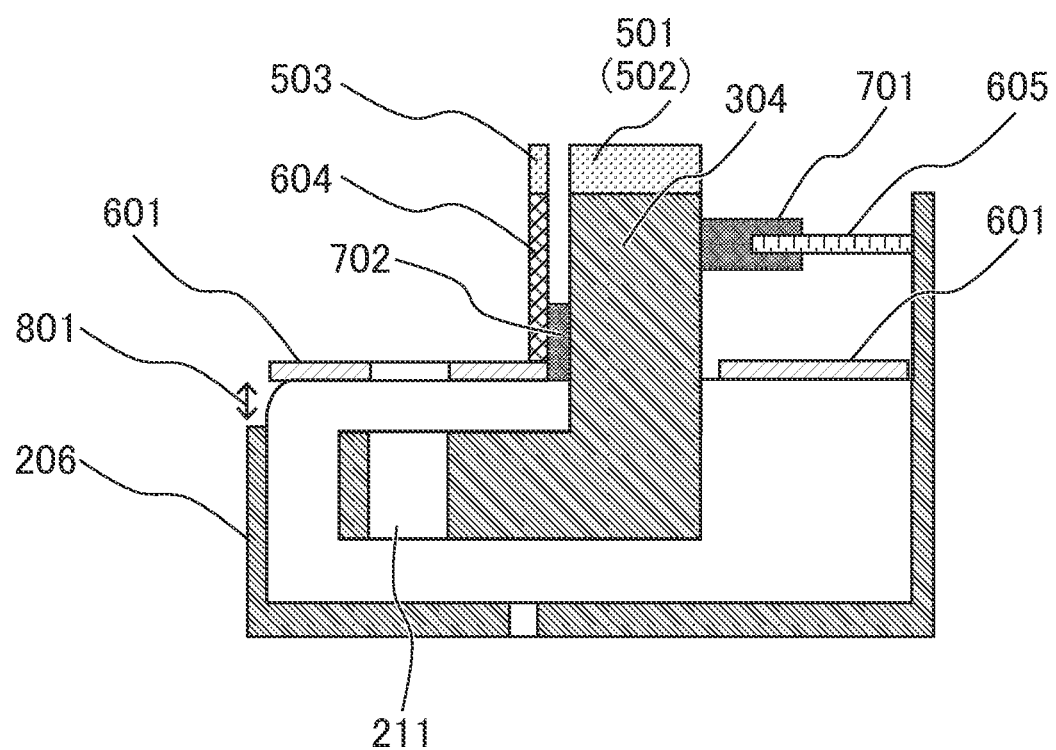
FIG. 13 illustrates one example in which the liquid surface cover, the scattering prevention cover attached with the sealing material and the surging suppressing cover attached therewith are provided over the ultrasonic cleaner.

It is possible to stabilize the liquid surface of a washing liquid and suppress the surging of the washing liquid toward a neck 304 by installing a liquid surface cover, a scattering prevention cover, a surging suppressing cover, and a sealing material but, on the other hand, the washing liquid may possibly be ejected from a hole of the liquid surface cover provided at the cylindrical hole 211 if the behavior of the washing liquid is excessively suppressed. A notched portion 801 therefore is provided at a part of the sidewall of a washing tank as shown in FIG. 13. As a result, when the internal pressure of the washing tank increases by installing covers and a sealing material, it is possible to release the increased pressure of the washing liquid by letting the washing liquid flow out from the notched portion 801.

Although dispensing of a sample in a biochemical automatic analyzer has been described as an example in the present embodiments, the ultrasonic cleaner according to the present invention can wash dispensing nozzles of other clinical test devices such as a sample dispensing probe, a dispensing probe of an immune automatic analyzer, and the like and an ISE (ion-selective electrode) probe, likewise.

LIST OF REFERENCE SIGNS

1: reaction disk
2: reaction vessel
3: washing mechanism
4: spectrophotometer
5, 6: stirring mechanism
7, 8: reagent dispensing mechanism
7a, 8a: reagent probe
9: reagent disk
10: reagent bottle
11, 12: sample dispensing mechanism
11a, 12a: sample probe
13, 14: washing tank for sample probe
15: sample vessel
16: sample rack
17: sample transport mechanism
18: pump for reagent
19: pump for sample
20: washing pump
21: control unit
23, 24: ultrasonic cleaner
30, 31: washing tank for stirring mechanism
32, 33: washing tank for reagent probe
100: automatic analyzer
201: front mass
202: rear mass
203: piezoelectric device
204: bolt
205: ultrasonic vibrator (BLT)
206: washing tank
207: base section
208: flange section
209: vibration head
210: tip end portion of vibration head
211: cylindrical hole
212: washing liquid supply line
213: liquid receptacle
214: drain pipe
215: head tip length
220: least vibration location in primary vibration mode
221: largest vibration location in primary vibration mode 222: first least vibration location in secondary vibration mode
223: largest vibration location in secondary vibration mode
224: second least vibration location in secondary vibration mode
304: neck of vibration head
310, 311: surging of washing liquid
410, 412: resonant point of vibration head
411, 413: resonant point of ultrasonic vibrator
414, 415, 416: waveform of applied voltage
501, 502, 503: coating film
601, 602, 603: liquid surface cover
604: scattering prevention cover
605: surging suppressing cover
701-707: sealing material
801: notched portion

The invention claimed is:

1. A ultrasonic cleaner comprising:
a washing tank in which a washing liquid is reserved; an ultrasonic vibrator; a vibration head provided with a neck extended from the ultrasonic vibrator to the washing tank and a tip end portion having a cylindrical hole whose longitudinal direction is oriented to a perpendicular direction; a first cover having openings corresponding to the neck and the cylindrical hole and is installed at a height of being in contact with the surface of the washing liquid in the manner of covering the washing tank; and at least one additional cover to suppress surging and/or scattering of the washing liquid from a space between the opening of the first cover corresponding to the neck and the neck.

2. The ultrasonic cleaner according to claim 1,
wherein the first cover is separated into plural sections, and
the first cover including the plural sections is arranged to the height in contact with the liquid surface of the washing liquid such that it covers the washing tank.

3. The ultrasonic cleaner according to claim 1 comprising a first sealing material arranged such that it is disposed between the first cover and the neck,
wherein the first sealing material is arranged such that it is in contact with the neck.

4. An ultrasonic cleaner according to claim 1, the at least one additional cover comprises a second cover disposed between the neck and the cylindrical hole,
wherein the cylindrical hole is configured to receive a sample probe when the sample probe is washed, the ultrasonic vibrator is configured to be driven with a frequency to allow resonant vibration of the vibration head, and the second cover suppresses the washing liquid from scattering from the washing tank to the sample probe owing to the vibration of the vibration head.

5. The ultrasonic cleaner according to claim 4, wherein a hydrophobic or hydrophilic coating film which has an interface between a region corresponding to a largest vibration location of the vibration head when subjected to the resonant vibration and a region corresponding to a least vibration location of the vibration head when subjected to the resonant vibration and covers the region corresponding to the least vibration location of the vibration head is formed on the vibration head, and
the hydrophobic or hydrophilic coating film is formed on a location of the second cover corresponding to the same height of the coating film of the vibration head.

6. The ultrasonic cleaner according to claim 5,
wherein the coating film is made of a fluorine resin film.

7. The ultrasonic cleaner according to claim 4, wherein the second cover is provided such that it surrounds the face of the neck opposed to a the cylindrical hole.

8. The ultrasonic cleaner according to claim 4 comprising a second sealing material provided between the second cover and the neck
wherein the second sealing material is arranged such that it is in contact with the neck.

9. An ultrasonic cleaner according to claim 1, the at least one additional cover comprises a third cover provided, between a connection section of the ultrasonic vibrator and the vibration head and the first cover such that the third cover runs in parallel with the first cover.

10. The ultrasonic cleaner according to claim 9,
wherein the third cover is provided on a face side of the neck opposed to the face of the neck on the side of the cylindrical hole.

11. The ultrasonic cleaner according to claim 9 comprising a third sealing material provided between the third cover and the neck,
wherein the third sealing material is provided such that it is in contact with the neck.

12. The ultrasonic cleaner according to claim 1, wherein the ultrasonic vibrator is configured to be driven with a frequency to allow the resonant vibration of the vibration head, and the ultrasonic vibrator is configured to be driven under soft start control or step control.

13. An automatic analyzer comprising: an ultrasonic cleaner according to claim 1; a sample dispensing mechanism provided with a sample probe to absorb a sample; and a control unit to control the ultrasonic cleaner and the sample dispensing mechanism,
wherein the control unit is configured to insert the sample probe into the cylindrical hole of the vibration head of the ultrasonic cleaner and to make the ultrasonic vibrator of the ultrasonic cleaner driven with a frequency to allow resonant vibration of the vibration head, thereby the sample probe being washed.

* * * * *